(12) United States Patent
Hyde et al.

(10) Patent No.: US 10,040,497 B2
(45) Date of Patent: Aug. 7, 2018

(54) ASSEMBLY FOR STORING BICYCLES

(71) Applicant: PFL Spaces Pty Ltd, Brisbane, Queensland (AU)

(72) Inventors: Craig Oliver Hyde, Logan Village (AU); Mark Anthony Rossiter, Brisbane (AU); Justin Louis Sires, Brisbane (AU)

(73) Assignee: PFL Spaces Pty Ltd, Brisbane, Queensland (AU)

( * ) Notice: Subject to any disclaimer, the term of this patent is extended or adjusted under 35 U.S.C. 154(b) by 0 days.

(21) Appl. No.: 15/544,041

(22) PCT Filed: Jan. 20, 2016

(86) PCT No.: PCT/AU2016/050026
§ 371 (c)(1),
(2) Date: Jul. 17, 2017

(87) PCT Pub. No.: WO2016/115600
PCT Pub. Date: Jul. 28, 2016

(65) Prior Publication Data
US 2017/0369114 A1    Dec. 28, 2017

(30) Foreign Application Priority Data
Jan. 20, 2015  (AU) ................................ 2015200238

(51) Int. Cl.
*A47F 7/00*    (2006.01)
*B62H 3/12*    (2006.01)
(Continued)

(52) U.S. Cl.
CPC ................. *B62H 3/12* (2013.01); *B62H 3/04* (2013.01); *B62H 3/08* (2013.01)

(58) Field of Classification Search
CPC ... B62H 3/12; B62H 3/04; B62H 3/08; B62H 3/00; B62H 2003/005; B62H 3/02;
(Continued)

(56) References Cited

U.S. PATENT DOCUMENTS 586,681 A * 7/1897 Douglas .................. B62H 3/12
                                                 211/19
621,819 A * 3/1899 Lyatt ....................... B60P 3/073
                                                 211/100
(Continued)

FOREIGN PATENT DOCUMENTS

| CH | 706067 | 7/2013 |
|---|---|---|
| EP | 1162131 | 12/2001 |
| EP | 1609708 | 12/2005 |

OTHER PUBLICATIONS

International Search and Written Opinion for International Application No. PCT/AU2016/050026, dated Feb. 15, 2016, 9 pages.

*Primary Examiner* — Jennifer E. Novosad
(74) *Attorney, Agent, or Firm* — Michael Best & Friedrich LLP

(57) ABSTRACT

An assembly for storing bicycles in an upright orientation and suitably with both wheels of the bicycles off the ground. The assembly is configured to suspend the bicycles from their front wheel by engaging the front tire of the bicycles, and without needing to engage the rim of the front wheel, or the frame of the bicycle. Moreover, the assembly is adapted to allow the bicycles located in the upright orientation to be moved while on the assembly from side-to-side to allow bicycles storage to be clustered together and a bicycle to be retrieve-from storage to be spaced further apart from adjacent bicycles.

18 Claims, 3 Drawing Sheets

(51) Int. Cl.
*B62H 3/04* (2006.01)
*B62H 3/08* (2006.01)

(58) Field of Classification Search
CPC ........ B62H 3/06; B62H 3/10; B62H 2700/00;
A47B 61/02; A47B 46/00; A47B 51/00;
A47B 53/00; A47F 7/04; A47F 5/08;
A47F 5/0846; A47F 5/0838; A47F
5/0853; A47F 5/0081; A47F 5/0093
USPC ................. 211/94.01, 117, 87.01, 151, 162;
224/405
See application file for complete search history.

(56) References Cited

U.S. PATENT DOCUMENTS

| | | | | | |
|---|---|---|---|---|---|
| 624,231 | A | * | 5/1899 | Martin | B62H 3/12 211/162 |
| 639,517 | A | * | 12/1899 | Butcher | B62H 3/04 211/19 |
| 2,917,185 | A | * | 12/1959 | Kovacs | A47G 25/746 211/94.01 |
| 3,162,417 | A | * | 12/1964 | Briggs | A23B 4/052 248/345.1 |
| 3,907,113 | A | * | 9/1975 | Kropelnitski | B62H 3/12 211/19 |
| 4,240,353 | A | * | 12/1980 | Barth | B61B 13/04 104/93 |
| 4,352,432 | A | * | 10/1982 | Smith | B62H 3/08 211/19 |
| 4,442,961 | A | * | 4/1984 | Bott | B60R 9/10 211/20 |
| 4,700,845 | A | * | 10/1987 | Fretter | B62H 3/12 211/17 |
| 4,869,378 | A | * | 9/1989 | Miller | A47F 5/0853 211/62 |
| 5,044,505 | A | * | 9/1991 | Spratt | A47B 57/54 211/189 |
| 5,083,729 | A | * | 1/1992 | Saeks | B62H 3/12 211/17 |
| 5,183,162 | A | * | 2/1993 | Ritzenthaler | B62H 3/12 211/1.57 |
| 5,294,006 | A | * | 3/1994 | Deschino | A47F 5/0853 211/103 |
| 5,511,675 | A | * | 4/1996 | Frederick | A47B 63/00 211/162 |
| 5,560,498 | A | * | 10/1996 | Porter | B60R 9/10 211/20 |
| 5,692,817 | A | * | 12/1997 | Jun | A47B 46/00 211/151 |
| 5,702,007 | A | * | 12/1997 | Fritz | B62H 3/08 211/17 |
| 5,749,474 | A | * | 5/1998 | Woodcock | A47F 7/00 211/18 |
| 5,772,048 | A | * | 6/1998 | Sopcisak | B62H 3/00 211/196 |
| 5,845,788 | A | * | 12/1998 | Robolin | A47F 3/08 211/1.51 |
| 5,941,397 | A | * | 8/1999 | Buchanan | B62H 3/12 211/19 |
| 5,984,111 | A | * | 11/1999 | Pennella | B62H 3/08 211/19 |
| 5,988,403 | A | * | 11/1999 | Robideau | A47F 7/00 211/17 |
| 6,098,815 | A | * | 8/2000 | Nesser | A47B 61/04 211/118 |
| 6,336,562 | B1 | * | 1/2002 | Mori | B62H 3/08 211/162 |
| 6,540,094 | B1 | * | 4/2003 | Baloga | G09F 7/08 211/169 |
| 6,729,478 | B1 | * | 5/2004 | Boers | B62H 3/12 211/18 |
| 6,843,380 | B1 | * | 1/2005 | Fickett | B62H 3/12 211/17 |
| 7,165,684 | B2 | * | 1/2007 | Ferron | B62H 3/12 211/118 |
| 7,401,705 | B2 | * | 7/2008 | Craft | A47B 96/00 211/103 |
| 7,407,060 | B2 | * | 8/2008 | Swartz | A47B 96/067 211/190 |
| 7,604,131 | B1 | * | 10/2009 | Clark | B62H 3/12 211/118 |
| 7,641,086 | B2 | * | 1/2010 | Green | B60P 3/07 224/403 |
| 7,694,830 | B1 | * | 4/2010 | Larson | B62H 3/08 211/20 |
| 7,946,432 | B1 | * | 5/2011 | Swanson | B62H 3/12 211/20 |
| 8,413,820 | B2 | * | 4/2013 | Steadman | B62H 3/06 211/21 |
| 8,528,749 | B2 | * | 9/2013 | Kerman | B62H 3/00 211/196 |
| 8,827,363 | B2 | * | 9/2014 | Lagier | B61B 12/002 105/149.2 |
| 8,950,592 | B1 | * | 2/2015 | Greenblatt | B62H 3/12 211/17 |
| 9,022,265 | B2 | * | 5/2015 | Wolfe | B60R 9/10 224/403 |
| 9,254,791 | B2 | * | 2/2016 | Wolfe | B60R 9/06 |
| 9,873,472 | B2 | * | 1/2018 | Greenblatt | B62H 3/12 |
| 2003/0141263 | A1 | * | 7/2003 | Dueck | A47F 7/00 211/17 |
| 2004/0050807 | A1 | * | 3/2004 | Cheng | B62H 3/12 211/17 |
| 2004/0060878 | A1 | * | 4/2004 | Ho | A47F 7/04 211/17 |
| 2004/0200791 | A1 | * | 10/2004 | Bostick | A47B 61/02 211/94.01 |
| 2008/0245753 | A1 | * | 10/2008 | Spriegel | A47F 5/0807 211/85.7 |
| 2010/0122963 | A1 | * | 5/2010 | Costa | A47B 61/02 211/94.01 |
| 2011/0011812 | A1 | * | 1/2011 | Johnson | A47F 5/0838 211/1 |
| 2013/0277404 | A1 | * | 10/2013 | Heininger | B60R 9/10 224/405 |
| 2015/0343938 | A1 | * | 12/2015 | Graham | B60P 3/077 410/3 |
| 2017/0369114 | A1 | * | 12/2017 | Hyde | B62H 3/12 |

* cited by examiner

ASSEMBLY FOR STORING BICYCLES

FIELD OF THE INVENTION

The present invention relates to an assembly for storing bicycles in an upright orientation, such as an inclined orientation. The bicycles being stored by the assembly may be elevated from the ground.

BACKGROUND

There are a range of different racks available for storing bicycles. One type of rack for storing bicycles on the ground includes semi-circular or arch structures projecting from the ground at approximately the same height as the frame of the bicycle. Bicycles can then be locked to the structures with both wheels on the ground. Another type of rack includes pairs of small arches that are spaced apart to allow a wheel of the bicycle to be positioned between the arches. The wheel or the frame of the bicycle can then be locked to the arches. Both of these types of racks may not be suitable when limited space is available.

There are also bicycle racks available for storing bicycles off the ground where limited space is available. Typically, off the ground storage racks include either hooks that can engage a wheel rim for supporting the bicycle, or pairs of arms for supporting a bicycle in an elevated position by engaging the horizontal bar of the bicycle frame between the seat post and the handle bars (or the goose neck of the handle bars). However, a difficulty with both of these racks is that an inner face of the wheel rim or the bicycle frame may have a particular profile that is not adapted to be engaged by the hooks or arms, or may be made of materials that can be damaged. For instance, the inner face of the wheel rim may have a pointed profile or may be made of carbon fibre that can be easily damaged.

It is therefore an object of the present invention to provide an alternative assembly for storing bicycles that can avoid, at least partially, these difficulties.

SUMMARY OF THE INVENTION

The present invention relates to an assembly for storing bicycles in an upright orientation in which the bicycles have an upper wheel and a lower wheel, the assembly including:
  a plurality of support frames, each having at least one supporting member arranged to support the weight of a bicycle by engaging the tyre of an upper wheel of the bicycle located in an upright orientation; and
  a rail on which the support frames are mounted so that the support frames can move along the rail, wherein the assembly is adapted so that the bicycles engaged by the support frames are supported in an elevated position above the ground to allow the support frames and bicycles supported thereon to move along the rail.

An advantage of the present invention is that bicycles can be stored in an upright orientation without using hooks or arms to engage either the wheel rim or the frame of the bicycle.

Another advantage of the present invention is that the spacing between the bicycles on the support frames can be adjusted. For example, the bicycles can be moved along the rail relative to each other to reduce spacing between the bicycles while being stored, and to increase the spacing between a bicycle that is being retrieved and adjacent bicycles being stored. In other words, a user can move the bicycles to gain greater access to their bicycle during, for example, loading and unloading of their bicycle from the assembly.

The terminology " . . . bicycles stored in an upright orientation . . . " or variations thereof in this specification embraces bicycles at an inclined orientation in which one wheel is located higher than the other so that there is an upper wheel and a lower wheel. For example, the upper wheel may be raised by at least half the diameter of the front wheel above the lower wheel. A bicycle stored in an upright orientation also embraces when one wheel is above the other wheel, and suitably directly over the other wheel. The term "upright orientation" also includes the bicycle being stored in a vertical orientation, or a near to vertical orientation.

It is possible that two or more of the support frames may be connected together and moves together along the rail. However in a preferred embodiment, at least two and suitably all of the support frames are unconnected so that the support frames can move freely along the rail without connection to an adjacent support frame.

The support frames may be directly mounted to the rail. In one example, the support frames may be adapted to slide along the rail. In another example, at least one of the support frames may be mounted to the rail by one or more carriages that move along the rail. Ideally, each of the support frames are mounted to the rail by one or more carriages having wheels that run along the rails.

The assembly may include two rails that are spatially separated and on which the support frames are operatively mounted to move along the rails. The two rails may include an upper rail and a lower rail and the carriages engage the upper and lower rails to locate the support frames in an operative upright orientation.

The two rails may be arranged to prevent the support frames from pivoting or swinging about the upper rail or the lower rail.

The assembly may have opposite sides about the rail, such as a front side and rear side, and the support frames may be arranged on one or both of the opposite sides.

In one embodiment, the support frames may be arranged on one side of the assembly. For example, the support frames may be arranged at a front side of the assembly so the bicycles are arranged on the front side only.

In another embodiment, the support frames may be arranged on both the front side and the rear side. For example, the support frames may be arranged such that each consecutive support frame is located alternatively on the opposite sides of the assembly.

The rail may have forwardly and rearwardly facing surfaces and each support frame may include a carriage for engaging the forwardly and rearwardly facing surfaces to locate, and optionally lock, the support frames in a forward and aft direction on the rail.

Throughout this specification, forward and rearward portions of the assembly may be from the perspective of a person loading a bicycle into the assembly. For example, a forward portion may be closer to a person loading a bicycle onto the assembly than an rear portion. In another example, a forwardly facing surface may face toward a person loading a bicycle onto the support frame, and a rearwardly facing surface may face away from a person loading a bicycle onto the support frames.

The or each rail may have two angled surfaces, such as a square cross-section.

The or each rail may have a rounded cross-section.

The lower rail may be adapted to prevent the support frames from moving upwardly, and conversely the upper rail may be adapted to prevent the support frames from moving downwardly. This can be advantageous when a user is lifting a bicycle from the assembly because the support frame can be prevented from moving upward and downward.

The carriage may have pairs of wheels, in which one of the wheels is arranged to engage the forwardly facing surface and the other is arranged to engage the rearwardly facing surface of the support rail.

In another embodiment, the wheels may have: i) a flat surface for co-operating with the flat surfaces of rails having a square cross-section, or ii) a concave surface for fitting onto rails having a rounded cross-section.

The support frames may be adapted to suspend the bicycle from the support frames by engaging an upper wheel of the bicycle. The upper wheel may be the front wheel of bicycle.

When the bicycle is located in the upright orientation, the rear wheel of the bicycle is positioned below, suitably directly below the front wheel when the bicycle is suspended from the support frames. In other words, the upper wheel may be the front wheel of the bicycle.

In one embodiment, the support frames ideally include at least two supporting members that engage spaced portions about the circumference of the tyre of the upper wheel. In other words, the tyre of the wheel can be cradled between the supporting members. The supporting members can be of any suitable form including U-shaped sections, in which the tyre of the wheel is received between arms of the U-shape. In another example, the supporting members may be linear shaped sections, or L-shaped sections.

The supporting members are ideally spaced apart so as to provide a forward supporting member and a rearward supporting member. When the wheel of a bicycle is located in one of the support frame, ideally the wheel is cradled between the forward and rearward supporting members. The axle of the front wheel may be located between the forward and the rearward supporting members.

The supporting members may be positioned at different heights. For example, the rearward supporting member may be located higher than the forward supporting member. In another example, the forward supporting member may be located higher than the rearward supporting member. When the forward supporting member is higher than the rearward supporting member, the forward supporting member may assist in preventing the bicycle from slipping forward from the support frame when the bicycle is being stored.

The forward and rearward supporting members may have surfaces that face toward an axle of the front wheel of the bicycle.

In one embodiment, the support frames may include three supporting members. In this situation, two of the supporting members may be aligned, one above the other. For example, one of the supporting members may be an upper rearward supporting member, another may be an intermediate rearward supporting member, and the other may be a lower forward supporting member. The lower forward supporting member may be located lower than the intermediate rearward supporting member.

In another embodiment, the supporting member may also include a single supporting member such as an upwardly facing concave channel that receives and extends about the tyre of the upper wheel of the bicycle.

The support frames may include at least one barrier member to which the supporting members are mounted. Suitably, each support frame includes two barrier members that are flanked by, and are interconnected by, the supporting members. The barrier members and the supporting members define an upwardly oriented opening that receives the upper wheel of the bicycle and can assist in orienting the wheel upright by engaging the side walls of the tyre of the bicycle.

The barrier member(s) may have any suitable formation, including plates, such as flat plates or lengths of tubing.

The barrier member(s) may be a length of material having a lower portion and an upper portion, and the rearwardly facing supporting member may be connected to the lower portion and the forwardly facing supporting member may be connected to the upper portion.

The barrier member(s) may be in the configuration of a heel having a lower forwardly extending section, an intermediate rearwardly extending section that extends upwardly from the lower forwardly extending portion, and an upwardly extending section that extends from the intermediately rearwardly extending portion. Ideally, the lower forward supporting member is located at, or toward a front of the forwardly extending section, and the rearward supporting member is located at, or toward a rear of the intermediate rearwardly extending section.

The upper rearward supporting member (that faces forwardly) may be connected to the upwardly extending section, the lower rearward supporting member (that faces forwardly) may be connect to a junction between the rearwardly and the upward extending sections, and the lower forward supporting member (that faces rearwardly) may be connected to the lower forward supporting member.

The support frames may also include a stabiliser formation for receiving the lower wheel of the bicycle located in an upright storage orientation.

The stabiliser formation may be a channel, having a rear wall for engaging the tyre of the lower wheel, and oppositely disposed side walls extending from the rear wall. In one example, the rear wall may be arranged in an inclined orientation. In another example, the rear wall may oriented in an upright orientation.

The support frames may also include a mast to which the barrier members and the stabiliser formation are attached.

The support frames may each also include a spacing member that abuts when the support frames are located adjacently in contact to each other. The spacing members may be sized so as to engage when the distance between upright axes of the support frames ranges from 200 mm to 450 mm.

The purpose of the spacing member is to prevent or minimise bicycles on adjacent support frames from hitting/clashing when the support frames are pushed together or concertinaed together. In one embodiment, the spacing member may be in the form of the carriages by which the support frames can move along the rail.

The assembly may also include posts on which the rails are mounted.

The support frames may be arranged at different heights such that bicycles received by the support frames can be located at different heights. The purpose of this feature is to minimise hitting or clashing of the handle bars and peddles of adjacent bicycles stored on the assembly. For example, the support frames are arranged at two heights, in which each consecutive support frame is located at one of the two alternative heights. In one example, the support frames include a lower support frame that is adjacent to at least one higher support frame, and each higher support frame is located adjacent to at least one lower support frame.

The present invention also relates to an installation in which the assembly has been mounted to a structure so that bicycles loaded onto the assembly are located above the ground. The structure may be a wall, a fence, a barrier, or any permanent structure, temporary structure or semi-permanent structure to which the assembly can be fitted.

BRIEF DESCRIPTION OF THE DRAWINGS

The present invention will now be described with reference to the accompanying drawings which can be briefly described as follows.

DETAILED DESCRIPTION

Figure 1:
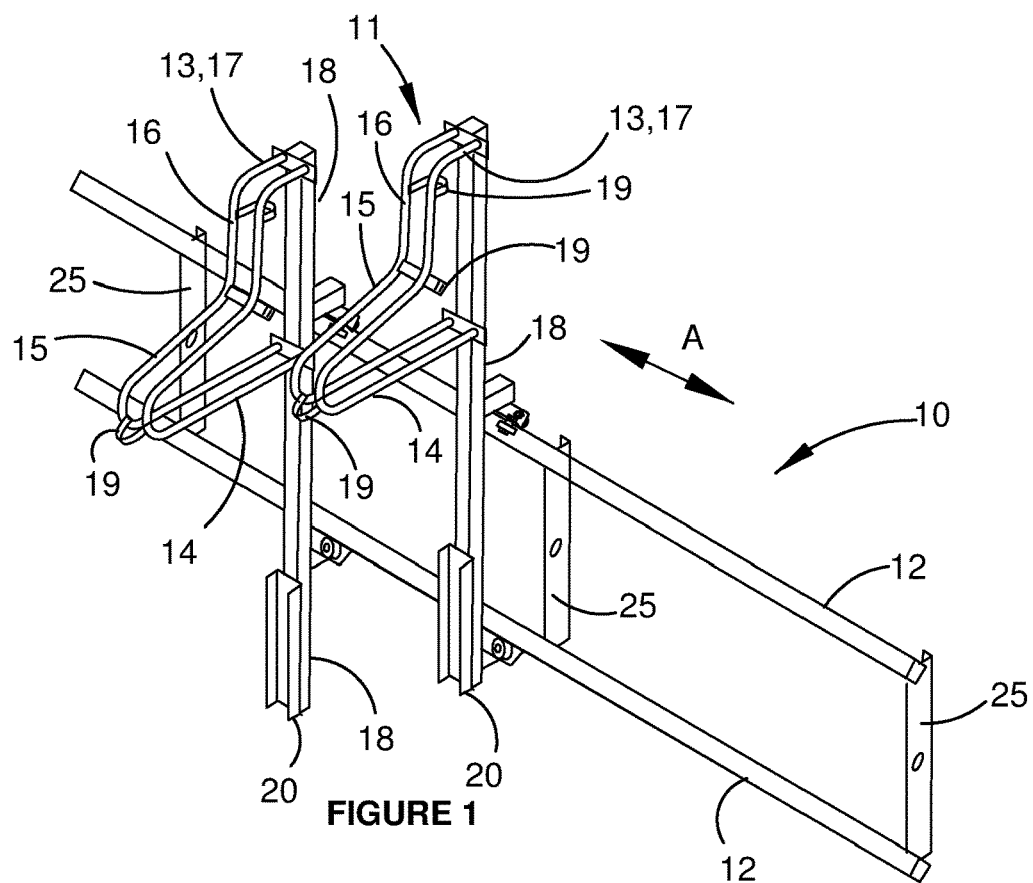
FIG. 1 is a perspective view of an assembly according to a preferred embodiment having two support frames for storing bicycles in an upright orientation and two rails on which the support frames can move sideways. Bicycles are not shown in FIG. 1.

A preferred embodiment of the present invention illustrated in the figures is described in the following text in which reference numerals have been allocated to help identify particular features. However in order to maintain the clarity of some figures, not all of the reference numerals have been included in each figure.

With reference to the drawings, the assembly 10 includes a plurality of support frames 11 and a pair of rails 12 on which the support frames 11 can move from side-to-side in the direction of arrow A. The assembly 10 is adapted for storing bicycles in an upright orientation in which the bicycles have an upper wheel and a lower wheel. The upper wheel is normally, but is not necessarily the front wheel of the bicycle, and a lower wheel is normally, but it not necessary the rear wheel. The support frames 11 are adapted to receive the upper wheel and engage the tyre of the wheel so as to support the weight of the bicycle.

Figure 5:
FIG. 5 is a photograph of an installation showing a single bicycle located in an upright position during storage.

A bicycle being supported on the assembly by engaging the tyre of the front wheel only is shown in FIG. 5.

FIGS. 1 to 4 illustrate only two support frames 11 in the assembly 10. However, as can be seen FIG. 5 the assembly 10 can include any number of the support frames 11 depending on the length of the rails 12 and the number of the support frames 11 can be optimised based on the floor area available for the assembly 10. Moreover, although not shown in the figures it is possible that two more adjacent support frames 11 may be interconnected. It is also possible that the rails 12 may have a curved path and/or that the support frames 11 may be removable from the rail 12, for example, for long-term storage of a bicycle loaded thereon, or when the support frame is not loaded.

As can be seen in the figures, ideally each support frame 11 is unconnected to an adjacent support frame 11 so as to be able to move from side-to-side without necessarily moving the adjacent support frame 11, and ideally each rail 12 is a linear rail 12. It is also intended that the support frames 11 will remain on the rail 12 irrespective of whether a bicycle is loaded onto its respective support frame 11.

One advantage of the assembly 10, is that the support frames 11 can be located at a height so that the bicycles, located in an upright orientation, can be held or suspended above the ground to assist in moving the bicycles from side-to-side, and maximise the available floor area.

Another advantage is that bicycles that do not need to be retrieved for a period can be placed closer together to minimise the space they occupy, whereas the bicycles that are being retrieved from storage can be spaced further apart from adjacent bicycles to facilitate removal of the bicycle from the assembly 10.

Each support frame 11 includes a pair of barriers 13 that are closely spaced to snuggly receive the front wheel of the bicycle and orient the wheel in an upright orientation.

From the perspective of a person loading a bicycle on the support frame 11, the barriers 13 include: i) a lower section 14 extending forwardly at the base portion of the support frame 11, ii) a higher section 15 extending rearwardly at a mid-portion, iii) an upwardly extending section 16, and iv) a rearwardly extending section 17 in an upper portion. The barriers 16 are each connected to a mast 18 that extends from the top to the bottom of the support frame 11. The barriers 16 are also interconnected by supporting members 19 that are suitably in the form of U-shaped members that receive and support the weight of the bicycle by engaging the tyre of the bicycle. The U-shaped supporting members 19 may be located at any convenient position, but are suitably located at a lower front position, and two rear positions on the barriers 13. The rear positions include one supporting member 19 at the junction between the rearwardly extending section 15 and the upwardly extending section of the barriers, and another supporting member 19 at the junction between the upwardly extending section 16 and the rearwardly extending section 17.

The front and rear supporting members 19 form a cradle that engages the tyre of the front wheel of the bicycle.

Attached to the lower end of the mast 18 is a stabilising formation 20 including a channel having a rear wall and two opposite side walls. The tyre of the bicycle fits between the opposite side walls and engages the rear wall to help hold the bicycle in an upright position.

Figure 2:
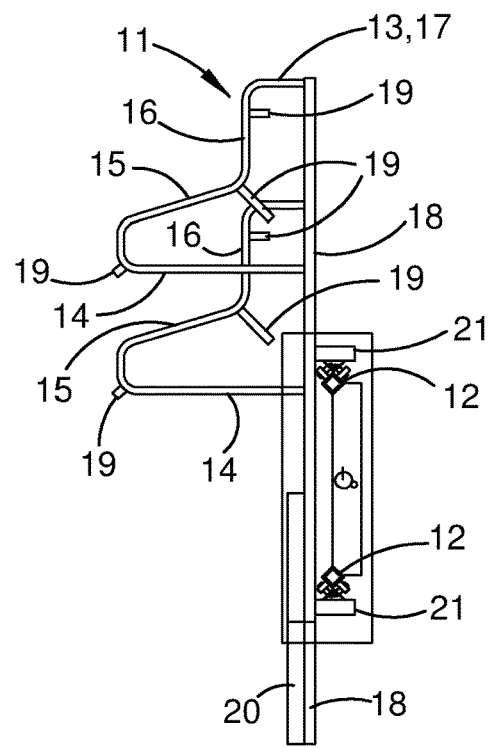
FIG. 2 is a side view of the assembly shown in FIG. 1.
Figure 4:
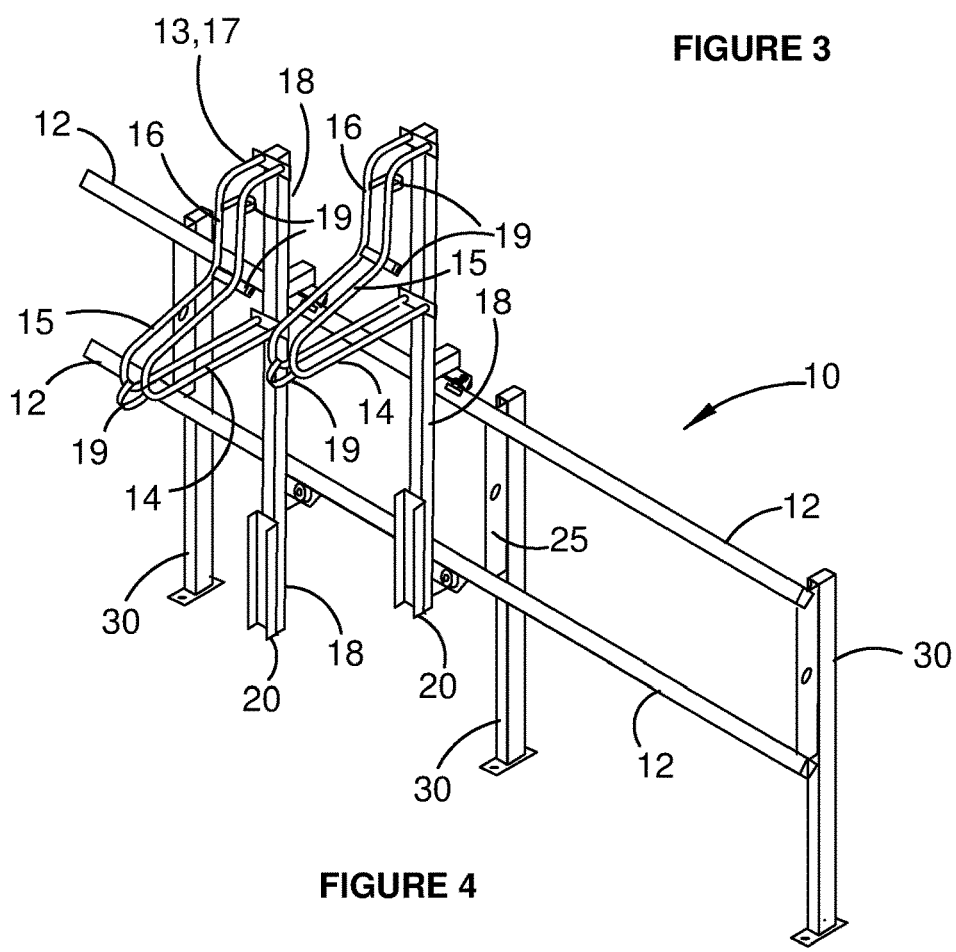
FIG. 4 is a perspective view of the assembly shown in FIG. 1, in which the assembly includes posts form anchoring the assembly to the ground.

The pair of rails 12 includes an upper rail and a lower rail on which the support frames 11 are mounted. As can be seen in FIGS. 1, 2, and 4, the support frames 11 include a mast 18 that are mounted to the rails 12 on carriages 21. The carriages 21 include a right angle base plate having rotating wheels 22, which may or may not include bearings. The wheels 22 engage the rails 12 to allow the support frames 11 to move from side-to-side.

Figure 3:
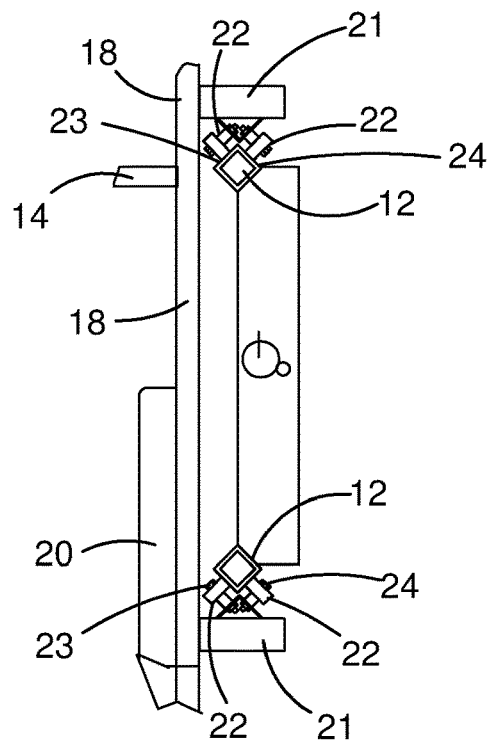
FIG. 3 is an enlarge side view of part of the side view in FIG. 2, and in particular shows the rails and carriages of one of the support frames.

As can best be seen in FIG. 3, the rails 12 include square sections that are oriented at an angle such that the upper rail has two upwardly facing surfaces, including a forwardly facing surface 23 and a rearwardly facing surface 24 that are engaged by the forward and rear wheels 22 of the carriages 21. Similarly, the lower rail 12 includes two downwardly facing surfaces, including a forwardly facing surface 23 and a rearwardly facing surface 24 that are engaged by the forward and rear wheels 22 respectively. The forward and rear surfaces 22, 23 of the rails 12 are engaged by the wheels 22 to lock the support frames 11 in a forward and aft direction, yet allows the support frames 11 to move along the rails 12.

The length of the base plates may be selected so that the carriages 21 form the widest part of the support frame 11 and abut when the support frames 11 are pushed together. The length of the carriages 21 can range from 200 mm to 450 mm, and thus the upright axis of adjacent support frames 11, for example denoted by the mast 18, are also spaced by 200 mm to 450 mm from each other. The benefit of this feature is the length of the carriages 21 can abut to prevent bicycles on adjacent support frames 11 clashing.

Although not shown in the figures, one or both of the upper and lower rails 12 may also include a stopper to prevent the support frames 11 from moving off the end of the rails 12. The stopper may be removed to allow the support frames 11 to be removed from the rail 12, or allow another support frame 11 to be added to the rail 12. Alternatively, the wheels 22 may be removed from the carriages to release the support frames 11 from the rails 12.

The rails 12 can be anchored directly to a support structure 11, such as a wall, fence or barrier. Ideally however, the assembly 10 may also include a mounting bracket 25 that spaces the rails 12 at the same distance long the length of the rails 12 and the mounting bracket 25 can be used to anchor the assembly 10 to a structure.

As can be seen in FIGS. 1, 2 and 4, the support frames 11 may also be arranged at different heights relative to the rails 12, or relative to each other. In other words, the support frames 11 may be offset at different heights, and more particularly, the adjacent support frames of the assembly 10 are offset relative to each other. The main advantage of this feature is that the handle bars and peddles of adjacent bicycles loaded onto the assembly 10 are less likely to clash, compared to a situation in which the support frames are all at the same height.

The embodiment shown in FIG. 4 is essentially the same as the embodiment shown in FIGS. 1 to 3, save for the assembly 10 including posts 30 connected to the mounting bracket 25 for mounting the assembly 10 above the ground.

FIG. 5 is a photograph of an installation of the assembly shown in FIG. 4 having ground engaging posts for mounting the assembly to the floor. The installation shown in FIG. 5 includes the features of the embodiment shown in FIG. 4, however, to maintain the clarity of the figures, reference numerals have not been added to FIG. 5. FIG. 5 also illustrates a bicycle stored by the assembly, in which the front wheel of the bicycle is suspended by a support frame so as to be able to be moved along a horizontal rail. The assembly includes thirteen additional support frames that are without bicycles. The support frames includes a mast connected to upper and lower carriages having wheels for running along the rails. As can be seen, the bicycle is suspended from two supporting members, namely a rearward U-shaped member facing forward, and a forward U-shaped member facing rearward that form a cradle on which the tyre of the front bicycle engages. The arms of the U-shaped members are connected to a pair of spatially separated barriers that form an upwardly facing opening that receives the front wheel of the bicycle. Each barrier includes: i) a lower section that extends outwardly from the mast and the forward U-shaped member is connected to a forward portion of the lower section; ii) an intermediate section that extends toward the mast, iii) an upright section that extends substantially parallel to the mast at a spacing thereto, and iv) a return section that extends from the upright section to the mast. The rearward U-shaped member is connected to the junction between the intermediate section and the upright section.

The support frame has been arranged to allow bicycles and bicycle wheels of various sizes to be accommodated by the support frame. Specifically, the intermediate section of the barriers is angled to extend upwardly from the lower section, this configuration helps to avoid the frame or forks of the front wheel of the bicycle from engaging the barrier. In addition, the length of the arms of the U-shaped members has also been selected to accommodate bicycle wheels of various diameters. As can be seen, the arms of the rearward U-shaped member are longer that the arms of the forward U-shaped member, yet the tyre engaging surface of the rearward U-shaped member is higher than the tyre engaging surface of the forward U-shaped member. In addition, by cradling the tyre of the wheel between the forward and rearward U-shaped members in which the forward U-shaped member is lower than the rearward U-shaped member, a user is able to remove the wheel of the bicycle from the cradle by only raising the front wheel of the bicycle to a smaller extent compared to if the forward U-shaped support member was arranged above the rearward support member.

In any event, when a bicycle is cradled between the forward and rearward supporting members, a user is required to move the bicycle upwardly over the forward supporting member to unload bicycle.

It will be understood by persons skilled in the art of the invention that many modifications may be made to the embodiment described above without departing from the spirit and scope of the invention.

For example, although not shown in the figures, it is possible that the rail may be loop formation, including a closed loop on which the support frames and bicycles can move. In another example, it is also envisaged that the support frame may be driven along or about the rail be drive mechanism, such as a flexible drive line, including a chain, cable, wire or so forth. It is also possible the each individual support frame may have a drive means such as a motor that drives the respective support frame along the rail. The assembly may include any controller for operating the drive mechanisms.

In another example, the support frames may be oriented to allow bicycles to be located on opposite sides of the support rail 12. For example, each consecutive support frame 11 of the assembly 10 may be located on alternating side of the support rail 12.

The invention claimed is:

1. An assembly for storing bicycles in an upright orientation in which the bicycles have an upper wheel and a lower wheel, the assembly including:
   a plurality of support frames, each having at least one supporting member arranged to support the weight of a bicycle by being configured to engage the tyre of an upper wheel of the bicycle located in an upright orientation; and
   at least one rail on which the support frames are mounted so that the support frames can move along the at least one rail, wherein the assembly is adapted so that the bicycles able to be engaged by the support frames are supported in an elevated position above the ground to allow the support frames and bicycles supported thereon to move along the at least one rail,
   wherein each support frame includes two supporting members, including a U-shaped forward supporting member and a U-shaped rearward supporting member, and the forward supporting member has a tyre engaging surface that faces rearwardly and the rearward supporting member has a tyre engaging surface that faces forwardly, wherein each support frame also include a pair of barrier members that are interconnected by the supporting members, and wherein the barrier members have a lower section and a higher section, and the forward supporting member is connected to the lower section and the rearward supporting member is connected to the higher section, and the higher section is angled to extend upwardly from the lower section, and arms of the rearward supporting member are longer that the arms of the forward supporting member, yet the tyre engaging surface of the rearward supporting member is higher than the tyre engaging surface of the forward supporting member.

2. The assembly according to claim 1, wherein each support frame is unconnected to the support frame adjacently located on the at least one rail.

3. The assembly according to claim 1, wherein the support frames are mounted to the at least one rail by one or more carriages having wheels that run along the at least one rail.

4. The assembly according to claim 3, wherein the assembly includes two rails, including an upper rail and a lower rail and the carriages engage the upper and lower rails to locate the support frames in an operative upright orientation.

5. The assembly according to claim 4, wherein each rail has forwardly and rearwardly facing surfaces and the support frames engage the forwardly and rearwardly facing surfaces to lock the support frames in a forward and aft direction on the rails.

6. The assembly according to claim 4, wherein each rail has a square cross-section or a rounded cross-section on which the support frames are mounted.

7. The assembly according to claim 1, wherein the upper wheel is a front wheel of the bicycle, and the forward and rearward supporting members are configured to engage spaced portions about the circumference of the tyre of the upper wheel.

8. The assembly according to claim 1, whereby when in use, the tyre of the upper wheel can be received between the arms of the forward supporting member and the reardward supporting member and a base of the supporting members between the arms can be the tyre engaging surface.

9. The assembly according to claim 1, wherein the pairs of barrier members and the supporting members interconnecting the barrier members define an upwardly oriented opening that is configured to receive the upper wheel of the bicycle.

10. The assembly according to claim 1, wherein the support frames include a stabiliser formation for receiving the lower wheel of the bicycle located in an upright storage orientation on each respective support frame.

11. The assembly according to claim 10, wherein the support frames also include a mast to which the barrier members and the stabiliser formation are attached.

12. The assembly according to claim 10, wherein the stabilizer formation has a rear wall for engaging the tyre of the lower wheel, and oppositely disposed side walls extending from the rear wall, and rear wall is arranged in an upright orientation.

13. The assembly according to claim 1, wherein the assembly includes posts adapted for being anchored to the ground, and the at least one rail is mounted to the posts.

14. The assembly according to claim 1, wherein the support frames include a spacing member and the spacing members are sized to abut or engage when the distance between upright axes of the support frames is in a range from 200 to 450 mm.

15. The assembly according to claim 14, wherein the support frames are mounted to the at least one rail by one or more carriages having wheels that run along the at least one rail, and wherein the spacing member is the carriage.

16. The assembly according to claim 1, wherein the support frames are arranged at different heights such that bicycles that can be received by the support frames can be located at different heights to reduce clashing or contact between bicycles on the support frames that are adjacent.

17. The assembly according to claim 1, wherein adjacent support frames are located at different heights.

18. The assembly according to claim 1, wherein the at least plurality of support frames and the rail are arranged to allow the at least plurality of the support frames to be move freely sideways while the bicycles are supported in the elevated position to allow a user to adjust the spacing between the bicycles by moving the support frames relative to each other.

* * * * *